United States Patent [19]
Martin et al.

[11] Patent Number: 5,649,779
[45] Date of Patent: Jul. 22, 1997

[54] CONSTANT RADIAL LOAD RING FOR DUST BOOT OF A SOCKET JOINT ASSEMBLY

[75] Inventors: Alan Martin, Blanchard; Donnie G. Wells, Norman, both of Okla.

[73] Assignee: Dana Corporation, Toledo, Ohio

[21] Appl. No.: 638,269

[22] Filed: Apr. 26, 1996

[51] Int. Cl.[6] ............................................. F16J 15/52
[52] U.S. Cl. ........................... 403/51; 403/134; 403/122; 277/212 FB
[58] Field of Search ............................ 277/212 FB, 166, 277/164; 403/50, 51, 122, 134

[56] References Cited

U.S. PATENT DOCUMENTS

| | | |
|---|---|---|
| 3,024,050 | 3/1962 | Moskovitz . |
| 3,147,537 | 9/1964 | Fade . |
| 3,175,834 | 3/1965 | Wallace . |
| 3,225,420 | 12/1965 | Sullivan, Jr. . |
| 3,262,706 | 7/1966 | Hassan . |
| 3,284,115 | 11/1966 | Schmidt . |
| 3,292,957 | 12/1966 | Ulderup . |
| 3,322,445 | 5/1967 | Hassan . |
| 3,476,417 | 11/1969 | Born et al. . |
| 3,901,518 | 8/1975 | Uchida . |
| 4,121,844 | 10/1978 | Nemoto et al. . |
| 4,322,175 | 3/1982 | Szczesny . |
| 4,856,795 | 8/1989 | DeLano et al. . |

FOREIGN PATENT DOCUMENTS

| | | |
|---|---|---|
| 2445105 | 9/1974 | Germany . |
| 1-193405 | 8/1989 | Japan . |
| 1-203712 | 8/1989 | Japan . |

*Primary Examiner*—William A. Cuchlinski, Jr.
*Assistant Examiner*—Christina Annick
*Attorney, Agent, or Firm*—Rader, Fishman & Grauer

[57] ABSTRACT

An annular constant radial load ring is adapted to be received in an end portion of a dust boot for use with a ball and socket assembly. The ring includes an annular central body with a plurality of generally Y-shaped fingers circumferentially spaced about an inner periphery of the central body. The fingers are biased radially outwardly to promote sealing engagement between the dust boot and its mating component.

20 Claims, 3 Drawing Sheets

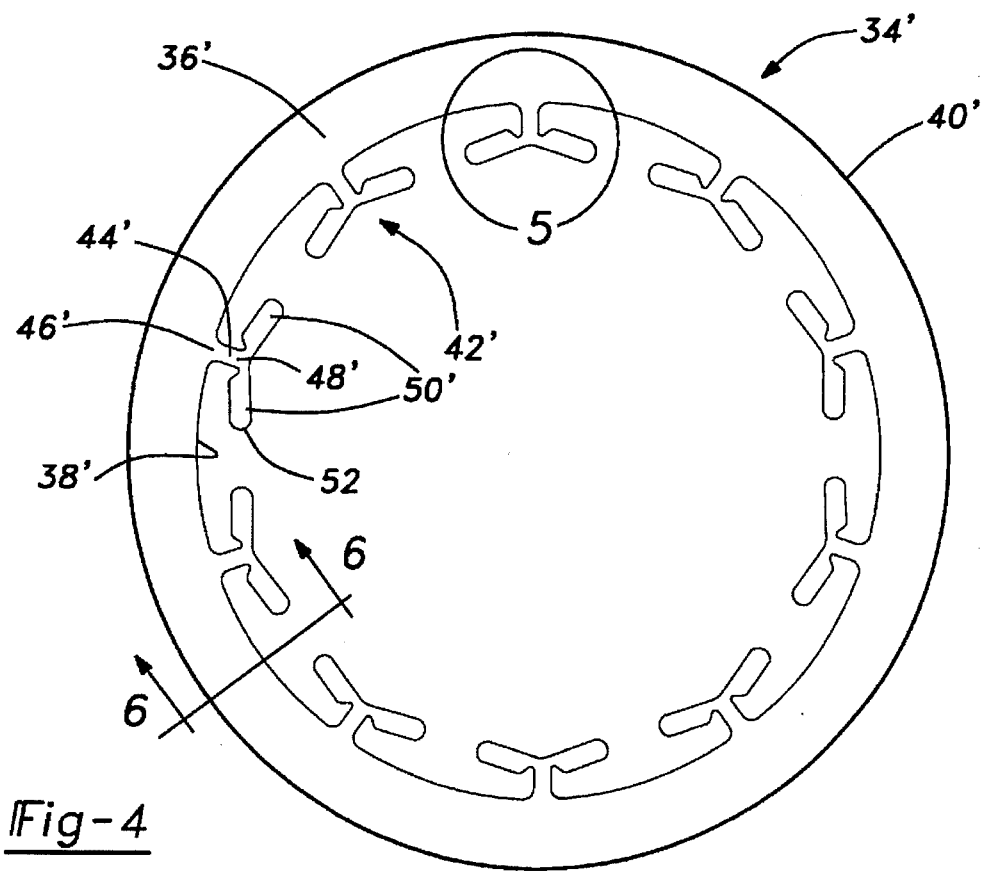
Fig-4
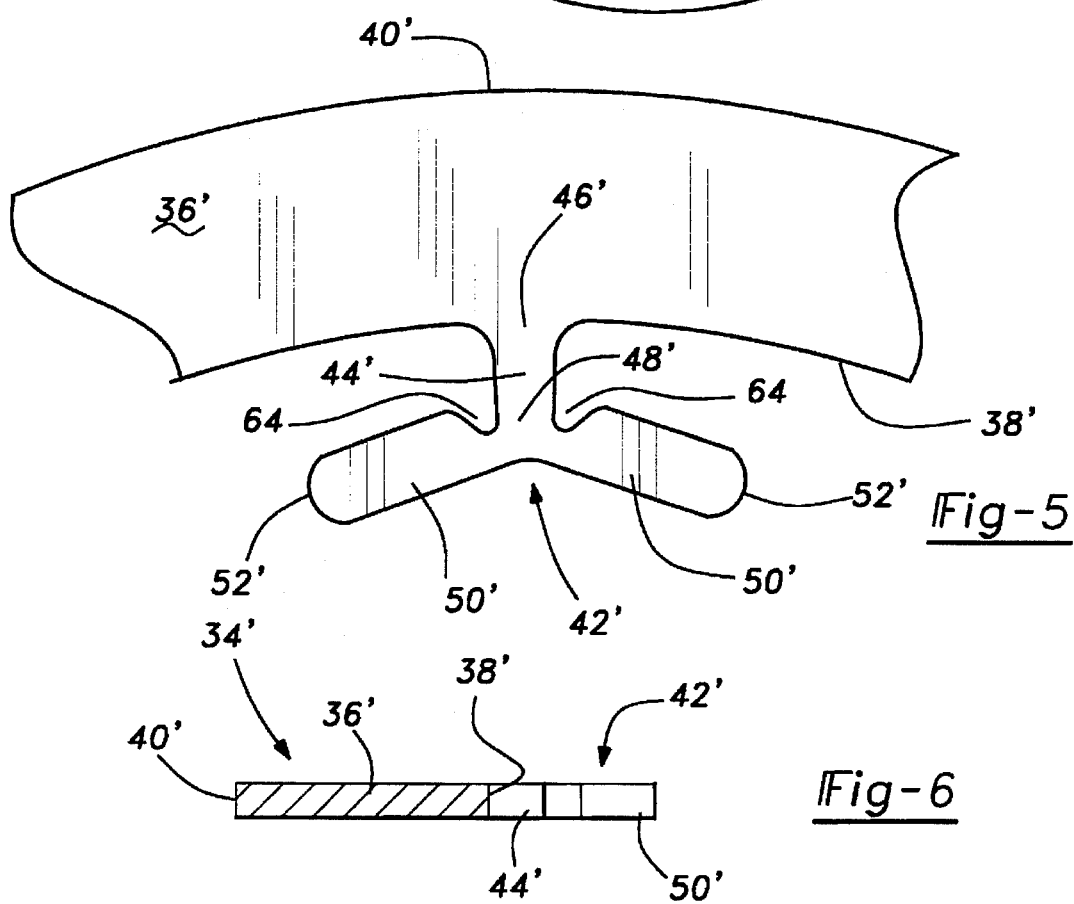
Fig-5
Fig-6

CONSTANT RADIAL LOAD RING FOR DUST BOOT OF A SOCKET JOINT ASSEMBLY

FIELD OF THE INVENTION

The invention relates to a pivot joint and more particularly to a constant radial load ring for use in a dust boot end portion sealing a ball stud shank.

BACKGROUND OF THE INVENTION

Ball and Socket joint assemblies and other types of pivot joints include an annular socket having a radially outer surface. A ball stud with a ball and shank are received in the socket such that the ball is enclosed in the socket while the shank extends away from the socket. The ball stud pivots and oscillates about the center of the ball. A dust boot is typically used with a ball and socket joint assembly to provide a sealing barrier against the entry to the assembly interior of dirt, water and related foreign material while simultaneously limiting the undesirable leakage of any lubricant used to promote assembly operation. Despite its sealing functions, however, the dust boot must provide for complete freedom of movement of the ball stud.

Typically, a dust boot is formed from an elastomeric material and includes two end portions. A first end portion cooperates with the radially outer surface of the socket while a second end portion cooperates with the ball stud shank. To promote sealing engagement it has been known to embed an annular retaining ring in at least one of the end portions to provide additional support. However, traditional retaining rings require very tight tolerances between the dust boot and the mating surface. As a result, the mating surface is typically machined. Yet, it is preferable to use forged sockets and shanks with greater tolerance ranges because of the reduced cost of production. One solution that has been proposed for retaining rings embedded in the end portion of a dust boot engaging the radially outer surface of a socket include the use of a circular array of fingers or tabs extending radially inwardly from a main body. Relatively short fingers position the end portion of the dust boot while relatively long fingers retain the dust boot in place. While the use of retaining rings with simple radially extending fingers may be adequate in the end portion of a dust boot associated with the annular socket, such a retaining ring is inadequate for use in the end portion engaging the ball stud shank. Unlike a fixed socket housing, a ball stud shank is subjected to extensive oscillation and pivoting during normal joint operation. As a result, it is particularly difficult to maintain a constant radial load between the dust boot end portion and the shank over the entire range of shank movement.

SUMMARY OF THE INVENTION

An annular constant radial load ring is adapted to be received in an end portion of an elastomeric dust boot for use with a ball and socket assembly. The ring includes an annular central body with a plurality of generally Y-shaped fingers circumferentially spaced about an inner periphery of the central body, a gap formed between each adjacent finger. The fingers are biased radially outwardly to promote sealing engagement between the dust boot and its mating component. More specifically, each of the fingers comprise a root with opposing ends. A first end of the root is preferably integral with the central body while two angled flanges extend radially inwardly from a second end of the root to terminate at a free end.

After being received in the end portion of the dust boot and the end portion brought into sealing engagement with a mating component of the ball and socket assembly, the flanges are biased radially outwardly from a rest position. They impose a radially inwardly directed force to provide a constant radial force to promote sealing engagement. The load ring is particularly useful in providing consistent sealing engagement between the dust boot and a shank of a ball stud even as the shank is subjected to extensive oscillation and pivoting during normal joint operation. Further, the use of the ring allows the use of less expensive forged shanks of different sizes with a greater tolerance range as opposed to a machined shank.

In one embodiment of the invention an outer periphery of the central body includes an upturned lip and upturned flanges to provide additional support and stability to the dust boot as well as additional biasing capability. In a second embodiment a transition zone is formed between the root and each of the flanges to form a region of stress relief for the fingers.

BRIEF DESCRIPTION OF THE DRAWINGS

The features and inventive aspects of the present invention will become more apparent upon reading the following detailed description, claims, and drawings, of which the following is a brief description:

FIG. 4 is a planar view of a second embodiment of the present invention;

FIG. 5 is an enlarged planar view of a portion of the retaining ring as shown by the encircled region 5—5 in FIG. 4; and FIG. 6 is a cross sectional view of the retaining ring of FIG. 4 taken along lines 6—6 as shown in FIG. 4.

DETAILED DESCRIPTION OF PREFERRED EMBODIMENTS

Figure 1:
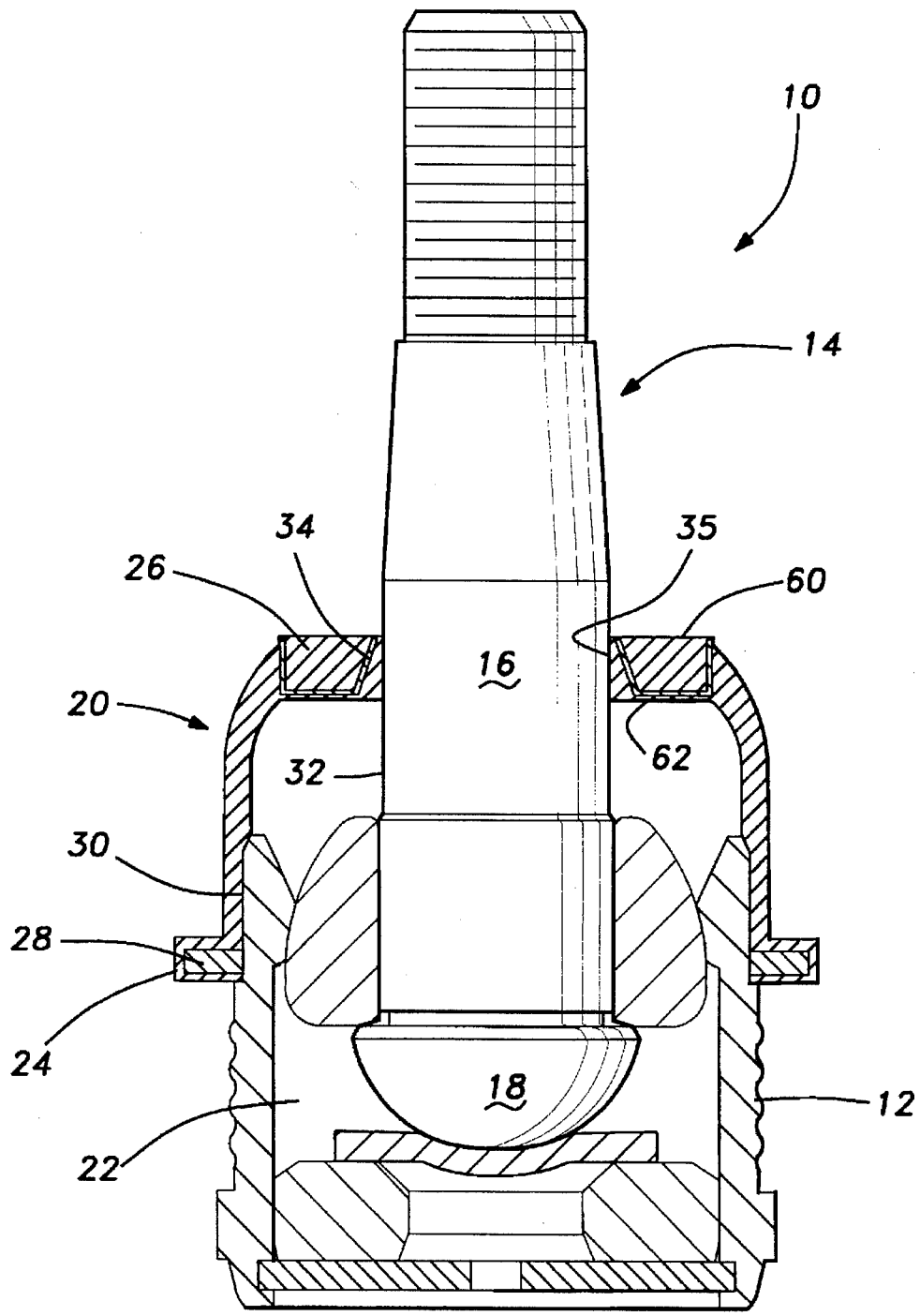
FIG. 1 is a cross sectional view of a socket joint assembly according to a first embodiment of the present invention.

A ball and socket assembly 10 is illustrated in FIG. 1 which includes a socket 12, a ball stud 14 with a shank 16 and a ball 18, and an elastomeric dust boot 20. Ball stud 14 is received in an inner cavity 22 such that ball 18 is enclosed in socket 12 while shank 16 extends away from the socket. The ball stud pivots and oscillates about the center of ball 18. Dust boot 20 is typically used with assembly 10 to provide a sealing barrier against the entry to the assembly interior of dirt, water and related foreign matter while simultaneously limiting the undesirable leakage of any lubricant used to promote assembly operation.

Despite its sealing functions, dust boot 20 must provide for the complete freedom of movement of ball stud 14 and shank 16. Dust boot 20 includes two axially disposed end portions 24 and 26. End portion 24 includes a traditional annular ring 28 embedded within the end portion which helps promote sealing engagement between a fixed radially outer surface 30 of socket 12 and the end portion of the dust boot. End portion 26 sealingly engages a radially outer surface 32 of shank 16. End portion 26 includes an inventive annular constant radial load ring 34 which is embedded in the end portion such that a radially innermost surface 35 of the end portion extends radially inwardly a greater extent than ring 34. Ring 34 helps to maintain a constant radial load between end portion 26 of dust boot 20 and shank 16 as the shank is subjected to extensive oscillation and pivoting during normal joint operation of assembly 10. Further, the use of retaining ring 34 allows the use of a less expensive forged shank with a greater tolerance range as opposed to a shank that has been machined.

Figure 2:
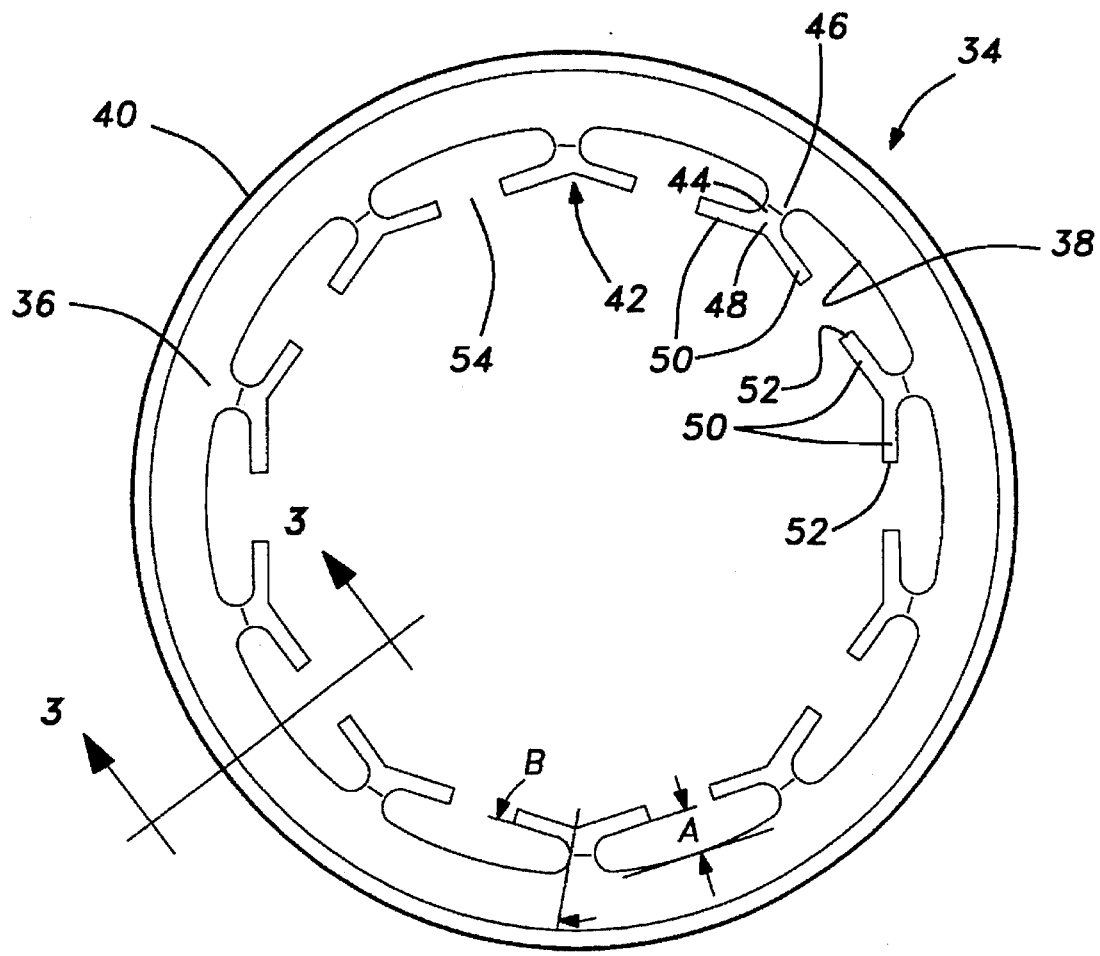
FIG. 2 is a planar view of a retaining ring according to a first of a first embodiment of the invention.
Figure 3:
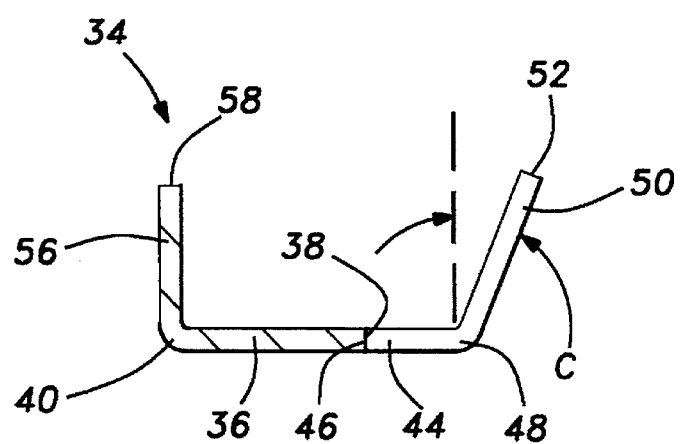
FIG. 3 is a cross sectional view of the retaining ring taken along lines 3—3 as shown in FIG. 2.

A first embodiment of a constant radial load ring 34 is illustrated in greater detail in FIGS. 2 through 3. Ring 34 includes an annular central body 36 having an inner periphery 38 and an outer periphery 40. A plurality of generally Y-shaped fingers 42 are circumferentially equally spaced about inner periphery 38 and extend radially inwardly. In the illustrated embodiment, ten equally circumferentially spaced fingers 42 are illustrated. Each finger 42 includes a root 44 with opposing ends 46 and 48. A radially outer first end 46 of root 44 is preferably integral with central body 36. End 46 is curved with respect to inner periphery 38 such that the end has a greater circumferential extent with respect to the inner periphery when compared to the rest of root 44. A radially inner second end 48 of root 44 includes two angled flanges 50 extending radially inwardly. Flanges 50 terminate at a radially inner free end 52. Ends 52 are all spaced an equal radial distance "A" from inner periphery 38 and share a common angle "B" with respect to root 44. Preferably, angle "B" is between approximately 100° and 120° and more preferably approximately 105°. The flanges themselves are preferably angled approximately 150° with respect to one another. A gap 54 is created between each two adjacent flanges 50 of different fingers 42.

In FIG. 2, ring 34 is shown a non-biased rest position. After being embedded in end portion 26 and the end portion brought into sealing engagement with shank 16, as illustrated in FIG. 1, however, flanges 50 of fingers 42 are biased radially outwardly from their rest position. Cimumferentially spaced flanges 50 impose a radially inwardly directed force within end portion 26 to provide a constant radial force which promotes a more constant area of contact and corresponding sealing engagement between dust boot 20 and shank 16 even as the shank is subjected to extensive oscillation and pivoting during normal joint operation.

As shown in FIG. 3, outer periphery 40 of central body 36 includes an upturned lip 56 while flanges 50 are upturned with respect to root 44. Preferably, lip 56 and flanges 50 are upturned in a in a common axial direction while root 44 and central body 36 lie in the same radially extending plane. Upturned lip 56 preferably extends perpendicular to central body 36 to provide additional support and stability for ring 34 within end portion 26. Upturned flanges 42 provide additional biasing between dust boot 20 and shank 16. Preferably, flanges are upturned at an angle "C" of approximately 45° to 80°. As illustrated in FIGS. 1 and 3, an end 58 of upturned lip 56 and ends 52 of flanges 50 terminate at a generally equal axial distance from central body 36 adjacent to upper surface 60 of end portion 26 while central portion 36 and roots are positioned adjacent to lower surface 62 of end portion 26.

A second embodiment of the present invention, a constant radial load ring 34', is illustrated in FIGS. 4 through 6. Constant radial load ring 34' includes an annular central body 36' having an inner periphery 38' and an outer periphery 40'. A plurality of generally Y-shaped fingers 42' are circumferentially equally spaced about inner periphery 38' and extend radially inwardly. Each finger 42' includes a root 44' with opposing ends 46' and 48'. A radially outer first end 46' of root 44' is integral with central body 36' while a radially inner second end 48' of root 44' includes two angled flanges 50' extending radially inwardly and terminating at a radially inner free end 52'. Ends 52' are radiused, however, to prevent possible damage to the elastomeric material of dust boot 20. Further, ring 34' includes a transition zone 64 formed between each root 44' and corresponding flanges 50' to form a region of stress relief for fingers 42', which reduces the likelihood of permanent finger deformation. As discussed above with respect to ring 34, after being embedded in end portion 26 and the end portion brought into sealing engagement with shank 16, flanges 50' of fingers 42' are biased radially outwardly from their rest position to impose a radially inwardly directed force to promote sealing engagement. Finally, as best illustrated in FIG. 6, outer periphery 40' and flanges 50' lie in the same plane as central body 36' and root 44'. In some applications additional biasing capability and corresponding support are not required. In such circumstances ring 34' may be preferred to ring 34 which in turn allows the use of a less extensive end portion 26.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed:

1. A constant radial load ring comprising:
   an annular central body having an inner periphery and an outer periphery; and
   a plurality of generally Y-shaped fingers circumferentially spaced about said inner periphery of said central body and extending radially inwardly, each of said fingers comprising a root with opposing ends, the first end of said root secured to said central body, and two angled flanges extending radially inwardly from a second end of said root, each of said flanges terminating at a free end.

2. A constant radial load ring as recited in claim 1, wherein each of said Y-shaped fingers is integral with said central body.

3. A constant radial load ring as recited in claim 1, wherein each of said flanges terminates at a common radial distance from said inner periphery of said central body.

4. A constant radial load ring as recited in claim 1, wherein said flanges have a common angle with respect to said root, said angle being between approximately 100° and 120°.

5. A constant radial load ring as recited in claim 4, wherein said angle is approximately 105°.

6. A constant radial load ring as recited in claim 1, wherein said flanges are angled approximately 150° with respect to each other.

7. A constant radial load ring as recited in claim 1, wherein said root has a base that is curved with respect to said inner periphery of said central body such that said base has a greater circumferential extent with respect to said inner periphery when compared to the rest of said root.

8. A constant radial load ring as recited in claim 1, wherein a transition zone is formed between said root and each of said flanges extending radially inwardly to form a region of stress relief for said Y-shaped fingers.

9. A constant radial load ring as recited in claim 1, wherein a gap is formed between each of said flanges of adjacent Y-shaped fingers.

10. A constant radial load ring as recited in claim 9, wherein there are at least 10 of said Y-shaped fingers equally spaced about said central body.

11. A constant radial load ring as recited in claim 1, wherein said outer periphery of said central body includes an upturned lip.

12. A constant radial load ring as recited in claim 1, wherein said flanges are upturned with respect to said central body, said angle being between approximately 45° and 80°.

13. A dust boot for use with a ball and socket assembly with a socket and a ball stud with shank comprising:

an elastomeric dust boot, said dust boot having two end portions, a first end portion adapted to sealingly engage said socket and a second end portion adapted to sealingly engage said shank; and a constant radial load ring including
an annular central body having an inner periphery, and an outer periphery, and
a plurality of generally Y-shaped fingers circumferentially spaced about said inner periphery of said central body and extending radially inwardly, each of said fingers comprising a root with opposing ends, the first end of said root integral with said central body and two angled flanges extending radially inwardly from a second end of said root, each of said flanges terminating at a free end, wherein each of said flanges terminate at a common radial distance from said inner periphery of said central body, a gap formed between each of said flanges of adjacent Y-shaped fingers, wherein said ring is embedded in one of said end portions, an innermost surface of said one of said end portions extending radially inwardly a greater extent than said ring.

14. A dust boot as recited in claim 13, wherein said outer periphery of said central body includes an upturned lip, said lip extending perpendicular to said central body.

15. A dust boot as recited in claim 13, wherein said flanges are upturned with respect to said central body.

16. A dust boot as recited in claim 13, wherein said outer periphery of said central body includes an upturned lip, said flanges being upturned with respect to said central body at an angle of approximately 45° to 80°, wherein both said lip and said flanges are upturned in a common direction.

17. A dust boot as recited in claim 13, wherein said ring is embedded in said second end portion.

18. A socket joint assembly comprising:

a socket having a radially outer surface;

a ball stud, said ball stud including a ball and a shank, said ball enclosed in said socket and said shank extending away from said socket, said shank oscillating and pivoting about a longitudinally extending axis extending through the center of said ball;

an elastomeric dust boot, said dust boot having two end portions sealingly engaging a mating surface, a first end portion sealingly engaging said radially outer surface of said socket and a second end portion sealingly engaging said shank; and a constant radial load ring embedded within at least one of said end portions of said dust boot, said ring including
an annular central body having an inner periphery and an outer periphery, and
a plurality of generally Y-shaped fingers circumferentially spaced about said inner periphery of said central body and extending radially inwardly, each of said fingers comprising a root with opposing ends, the first end of said root secured to said central body and two angled flanges extending radially inwardly from a second end of said root, each of said flanges terminating at a free end, said flanges being biased radially outwardly from a rest position and imposing a radially inwardly directed force within at least one of said end portions toward said mating surface to promote sealing engagement to the mating surface.

19. A socket joint assembly as recited in claim 18, wherein each of said flanges terminate at a common radial distance from said inner periphery of said central body and the angle of said flanges being approximately 105°, a gap formed between each of said flanges of adjacent Y-shaped fingers.

20. A socket joint assembly as recited in claim 18, wherein said outer periphery of said central body includes an upturned lip, said flanges being upturned with respect to said central body, wherein both said lip and said flanges are upturned in a common direction.

* * * * *